United States Patent
Bettua et al.

(10) Patent No.: US 9,232,837 B2
(45) Date of Patent: Jan. 12, 2016

(54) LUGGAGE WITH CRUSHABLE, RESILIENT PORTIONS AND METHODS FOR MANUFACTURING IT

(75) Inventors: Michael Bettua, Hoboken, NJ (US); Kiran Joseph, Chennai (IN)

(73) Assignee: Max Mirani Investments, LLC, New York, NY (US)

( * ) Notice: Subject to any disclaimer, the term of this patent is extended or adjusted under 35 U.S.C. 154(b) by 400 days.

(21) Appl. No.: 13/371,272

(22) Filed: Feb. 10, 2012

(65) Prior Publication Data

US 2012/0285781 A1    Nov. 15, 2012

Related U.S. Application Data

(60) Provisional application No. 61/441,577, filed on Feb. 10, 2011.

(51) Int. Cl.
| | |
|---|---|
| A45C 7/02 | (2006.01) |
| A45C 5/03 | (2006.01) |
| A45C 5/02 | (2006.01) |
| A45C 5/14 | (2006.01) |
| A45C 7/00 | (2006.01) |
| B29C 51/00 | (2006.01) |
| B29C 51/10 | (2006.01) |

(Continued)

(52) U.S. Cl.
CPC ... *A45C 5/03* (2013.01); *A45C 5/02* (2013.01); *A45C 5/14* (2013.01); *A45C 7/0036* (2013.01); *B29C 51/002* (2013.01); *B29C 51/10* (2013.01); *B29C 51/06* (2013.01); *B29C 51/46* (2013.01); *Y10T 29/49877* (2015.01)

(58) Field of Classification Search
CPC ........ A45C 5/14; A45C 13/262; A45C 5/146; A45C 13/385; A45C 3/004
USPC ............ 190/18 A, 18 B, 103, 107, 108–126; 206/315.1, 315.9; 383/127; D2/263–265; 428/138
See application file for complete search history.

(56) References Cited

U.S. PATENT DOCUMENTS

| | | | | |
|---|---|---|---|---|
| 3,084,771 A | * | 4/1963 | Davis | A45C 3/001 190/113 |
| 3,654,012 A | | 4/1972 | Schlager | |

(Continued)

FOREIGN PATENT DOCUMENTS

WO    WO2011156770    12/2011

OTHER PUBLICATIONS

Gearbuyer, "Burton Women's Wheelie Cargo." Internet. Available at http://www.gearbuyer.com/products/burton_wheelie_cargo.html. Last visited Feb. 10, 2012, and believed to be available as of Dec. 15, 2009.

(Continued)

*Primary Examiner* — Fenn Mathew
*Assistant Examiner* — Cynthia Collado
(74) *Attorney, Agent, or Firm* — PatentBest; Andrew McAleavey (57) ABSTRACT

Luggage with crushable, resilient portions and methods for making it are disclosed. In one embodiment, the cover of a piece of luggage is formed of a thermoplastic urethane (TPU) and has sufficient deformability so that it may be crushed and inverted into itself for storage and then resiliently returned to essentially the same shape. The luggage is preferably made by a process of vacuum forming a heated TPU sheet over a mold.

21 Claims, 8 Drawing Sheets

(51) Int. Cl.
B29C 51/06 (2006.01)
B29C 51/46 (2006.01)

(56) References Cited

U.S. PATENT DOCUMENTS

| | | | |
|---|---|---|---|
| 4,369,225 A | | 1/1983 | Manabe et al. |
| 5,316,822 A * | | 5/1994 | Nishijima et al. .. B29C 37/0057 |
| | | | 156/244.25 |
| 5,874,133 A | | 2/1999 | Cochran |
| 7,500,547 B2 * | | 3/2009 | Bettua ...................... A45C 5/14 |
| | | | 190/103 |
| 2004/0065518 A1* | | 4/2004 | Hoberman ........... A45C 13/385 |
| | | | 190/107 |
| 2005/0284791 A1 | | 12/2005 | Sadow |
| 2006/0096611 A1* | | 5/2006 | Leppla et al. ................. 132/294 |
| 2006/0134401 A1* | | 6/2006 | Yeh ......................... B32B 5/024 |
| | | | 428/316.6 |
| 2006/0222841 A1 | | 10/2006 | Masumizu et al. |
| 2010/0089779 A1 | | 4/2010 | Bowers |
| 2011/0209465 A1 | | 9/2011 | Novellani et al. |
| 2011/0308907 A1 | | 12/2011 | Hou |

OTHER PUBLICATIONS

Alibaba, "TPU Film for Bags and Luggage Lamination." Internet. Available at http://www.alibaba.com/showroom/tpu-film-for-bags-and-luggage-lamination.html. Last visited Feb. 10, 2012.
Tootoo, "TPU Laminated Fabric/TPU Coated Nylon Fabric." Internet. Available at http://www.tootoo.com/s-ps/tpu-laminated-fabric-tpu-coated-nylon-fabric--p-2271568.html. Last visited Feb. 10, 2012.
Coating-China, "Luggage Making Fabric." Internet. Available at http://coating-china.en.gongchang.com/product/7698439. Last visited Feb. 10, 2012.
TIMBUK2, "Terrifying TPU." Internet. Available at http://www.timbuk2.com/blog/2011/07/30/terrifying-tpu/. Last visited Feb. 10, 2012.
Nice Industry, "TPU Bags." Internet. Available at http://www.niceindustry.com/product_show.asp?keyno=1085. Last visited Feb. 10, 2012.
Weiko, "TPU Resin Skin Cover Case for Blackberry 8900 Javelin." Internet. Available at http://www.weiku.com/products/2598052/TPU_Resin_Skin_Cover_Case_for_Blackberry_8900_Javelin.html. Last visited Feb. 10, 2012.
Asian Products, "Droid TPU Gel Case." Internet. Available at http://www.asianproducts.com/hotproduct/manufacturer_droid-tpu-gel-case_1.htm. Last visited Feb. 10, 2012.
BASF, "TPU Properties." Internet. Available at http://www2.basf.us/urethanechemicals/tpu/tpu_properties.htm. Last visited Feb. 10, 2012, and believed to be available as of Oct. 17, 2010.
American Chemistry Council, "Thermoplastic Polyurethane." Internet. Available at http://www.polyurethane.org/s_api/sec.asp?CID=910&DID=3623. Last visited Feb. 10, 2012.
Flex Systems, "TPU (Thermoplastic Polyurathane)." Internet. Available at http://www.flexsystems.com/ProductDescription.asp?Prodid=22. Last visited Feb. 10, 2012, and believed to be available as of Oct. 12, 2009.
Longtai (Xiamen) Plastic Industrial Co., Ltd, "PVC TPU Leather." Internet. Available at http://ltpcmkpl.b2bmake.com/sell-show-pvc-tpu-leather-2616216.html. Last visited Feb. 10, 2012.
Burton. "Burton Wheelie Cargo." Internet. Available at http://www.gearbuyer.com/products/burton_wheelie_cargo.html. Visited Jan. 11, 2012.
Alibaba. "tpu film for bags and luggage lamination." Internet. Available at http://www.alibaba.com/showroom/tpu-film-for-bags-and-luggage-lamination.html. Visited Jan. 11, 2012.
Wujiang City Yunjie Textiles Co., Ltd. "TPU Laminated Fabric/TPU Coated Nylon Fabric." Internet. Available at http://www.tootoo.com/s-ps/tpu-laminated-fabric-tpu-coated-nylon-fabric--p-2271568.html. Visited Jan. 11, 2012.
CTA HI-Tech Textiles Co., Ltd. "Luggage making fabric (TPU)." Internet. Available at http://coating-china.en.gongchang.com/product/7698439. Visited Jan. 11, 2012.
TIMBUK2. "Terrifying TPU." Internet. Available at http://www.timbuk2.com/blog/2011/07/30/terrifying-tpu/. Visited Jan. 11, 2012.
Nice Industry. "TPU bags." Internet. Available at http://www.niceindustry.com/product_show.asp?keyno=1085. Visited Jan. 11, 2012.
Fletron. "TPU Resin Skin Cover Case for Blackberry 8900 Javelin." Internet. Available at http://www.weiku.com/products/2598052/TPU_Resin_Skin_Cover_Case_for_Blackberry_8900_Javelin.html. Visited Jan. 11, 2012.
Asian Products. "droid tpu gel case." Internet. Available at http://www.asianproducts.com/hotproduct/manufacturer_droid-tpu-gel-case_1.htm. Visited Jan. 11, 2012.
BASF. "TPU Properties." Internet. Available at http://www2.basf.us/urethanechemicals/tpu/tpu_properties.htm. Visited Jan. 11, 2012.
American Chemistry Council. "Thermoplastic Polyurethane." Internet. Available at http://www.polyurethane.org/s_api/sec.asp?CID=910&DID=3623. Visited Jan. 11, 2012.
Flex Systems Inc. "TPU (thermoplastic polyurethane)." Internet. Available at http://www.flexsystems.com/ProductDescription.asp?Prodid=22. Visited Jan. 11, 2012.
Longtai (Xiamen) Plastic Industrial Co., Ltd. "Company Home." Internet. Available at http://ltpcmkpl.b2bmake.com/. Visited Jan. 11, 2012.
Longtai (Xiamen) Plastic Industrial Co., Ltd. "For Sale." Internet. Available at http://ltpcmkpl.b2bmake.com/sell-show-pvc-tpu-leather-2616216.html. Visited Jan. 11, 2012.

* cited by examiner

LUGGAGE WITH CRUSHABLE, RESILIENT PORTIONS AND METHODS FOR MANUFACTURING IT

CROSS-REFERENCE TO RELATED APPLICATIONS

This application claims priority to U.S. Provisional Patent Application No. 61/441,577, filed Feb. 10, 2011. That application is incorporated by reference in its entirety.

BACKGROUND OF THE INVENTION

1. Field of the Invention

In general, the invention relates to luggage with crushable portions and to methods of making such luggage.

2. Description of Related Art

Travel has increasingly become a part of modern life. In today's highly interconnected world, many executives travel thousands of miles a year attending to business. Leisure travel has increased as well, and many people now consider vacations and other trips of a scope and duration that would have been unheard of in the past.

Most travelers use luggage to store and protect their possessions while traveling. Many different types of luggage are in use today, including conventional hard-sided and soft-sided suitcases, duffel bags, garment bags, and upright roller travel bags. Of the conventional types of luggage, upright roller travel bags, which are suitcases that have integrated wheels and an integrated rigid, telescoping handle, have become particularly popular because they can be wheeled easily from place to place, are stable and easily controlled while in motion, and have handles that conveniently collapse into the bag.

One problem with conventional luggage is that when it is not in use, it often takes quite a bit of space to store. Even luggage sets, which allow smaller pieces of luggage to be stored inside larger ones, still require enough space to store the largest piece. However, storage space is often at a premium, making luggage storage an inconvenient hassle.

There are a few solutions to the problem of luggage storage. For example, soft-sided pieces of luggage, such as duffel bags, are generally very collapsible and can be stored easily in a minimum of space, but they are not able to protect possessions as well as hard-sided luggage. Hybrid solutions that provide some of the strength and rigidity of hard-sided luggage while collapsing or folding for storage may offer consumers the most flexibility and the best balance of protection and storability. For example, U.S. Pat. No. 7,500,547 to Bettua et al. discloses hard-sided luggage that folds along pre-defined fold lines into a storage configuration.

However, while hybrid luggage that includes both rigid and flexible portions may be advantageous for the user, both in terms of the protection it offers and its storability, making such luggage can present materials and engineering challenges.

SUMMARY OF THE INVENTION

One aspect of the invention relates to a piece of luggage. The piece of luggage has a back or bottom portion and a cover portion. The cover portion and the back portion both have depth and contribute to the internal volume of the piece of luggage, but they need not have equal depths. The back portion of the piece of luggage may carry wheels and a telescoping handle assembly.

The cover portion of the piece of luggage is made of a deformable, resilient material that can be deformed or "crushed" and essentially inverted into the piece of luggage, reducing the depth of the piece of luggage for storage purposes. However, in embodiments according to this aspect of the invention, the material of the deformed cover portion will resiliently resume its original shape and configuration easily. The back portion of the piece of luggage may be made either of a deformable, resilient material such that it is also crushable, or it may be made of a more rigid material. One suitable deformable, resilient material is thermoplastic urethane (TPU). The TPU may be used alone as the outermost layer and structural material of the cover portion and, optionally, the back portion, or it may be used with other layers of material and/or selectively reinforced, particularly along corners and edges.

Another aspect of the invention relates to methods for making luggage using TPU. In methods according to this aspect of the invention, TPU sheet material is heated for a defined period of time at a defined temperature and then placed in contact with a mold. Vacuum is drawn against the TPU sheet material to force the sheet to conform to the contours of the mold. The formed TPU sheet is released from the mold after a period of time, and may be cooled over a form with the same shape as that of the mold. Once formed and cooled, the TPU sheet may be cut and otherwise processed to form a luggage cover portion, a back portion, or another part.

Yet another aspect of the invention relates to luggage covers and other parts made by a vacuum forming process.

These and other aspects, features, and advantages of the invention will be set forth in the description that follows.

BRIEF DESCRIPTION OF THE DRAWING FIGURES

The invention will be described with respect to the following drawing figures, in which like numerals represent like elements throughout the views, and in which.

DETAILED DESCRIPTION

Figure 1:
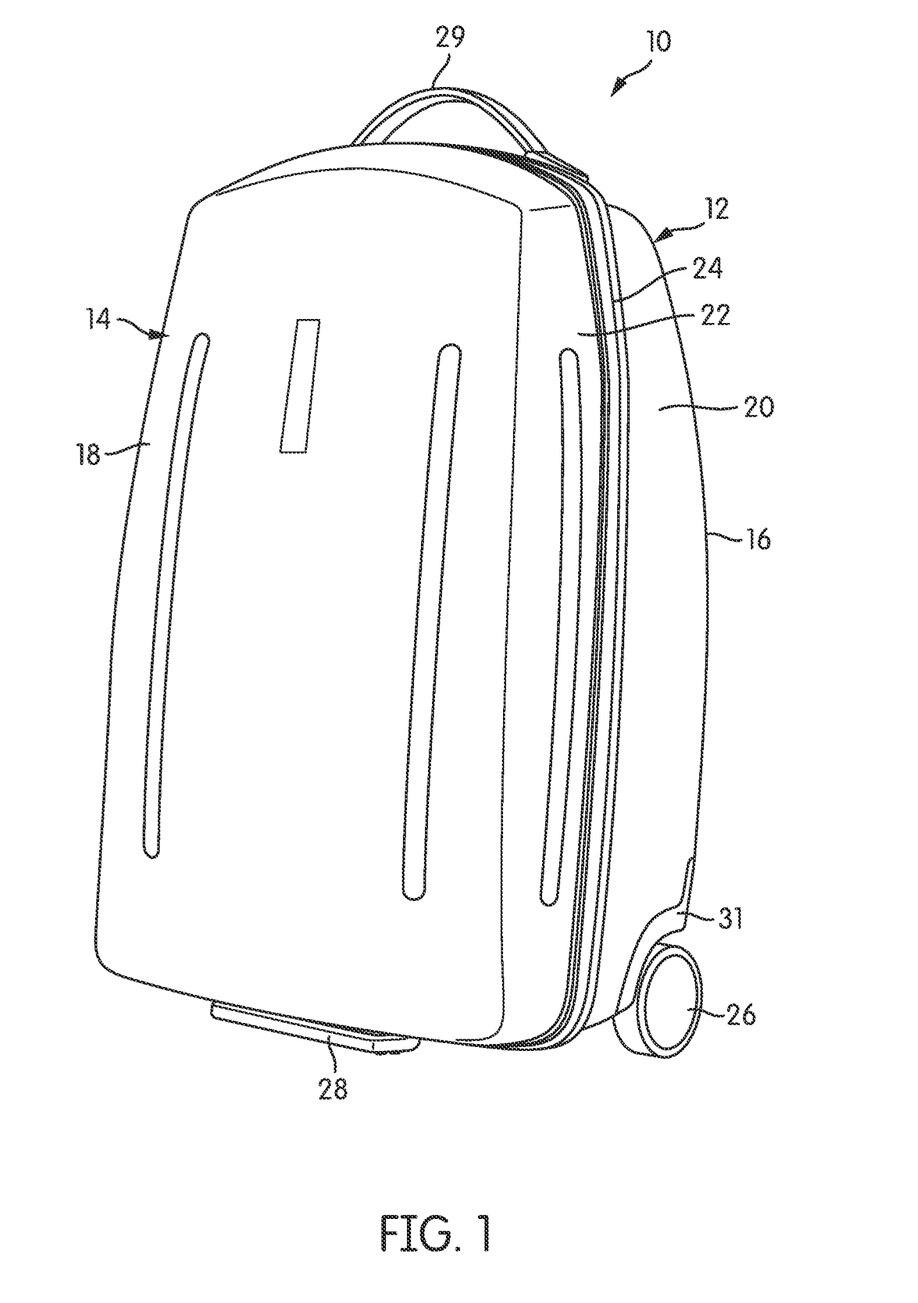
FIG. 1 is a perspective view of a piece of luggage according to one embodiment of the invention.

FIG. 1 is a perspective view of a piece of luggage, generally indicated at 10, according to one embodiment of the invention. The luggage 10 is comprised primarily of two formed pieces or "shells" of material 12, 14. Each shell of material includes a major area 16, 18, which may be flat, planar, or contoured, and a depending, generally perpendicular lip 20, 22 extending around the perimeter of the major area 16, 18. With this arrangement, one shell of material 12 serves as the bottom or back portion of the piece of luggage 10, while the other shell of material 14 serves as the front or cover portion of the piece of luggage 10. The perpendicular lips 20, 22 of the back portion 12 and the front portion 14 serve as sidewalls of the piece of luggage 10.

Both the back portion 12 and the cover portion 14 thus have substantial depths, and both contribute to the interior volume of the piece of luggage 10. However, they need not have equal depths. For example, the back portion 12 may have a depth of about 5.5 inches, while the front portion may have a depth of about 3 inches. In some cases, however, both portions 12, 14 may be deeper; for example, either portion or both portions 12, 14 may be up to about 7-8 inches deep.

The back portion 12 and the front portion 14 are hingedly connected to one another along one side, so that they can open and close relative to one another. Along the other three sides, they are releasably connected to one another by a zipper track 24, allowing the luggage 10 be repeatedly opened and closed. The zipper track 24 may be covered by piping, flaps, or other structures to prevent water and other elements from entering the luggage 10 when it is closed.

The piece of luggage 10 is, generally speaking, of the upright roller style, with the back portion 12 carrying wheels 26 and a telescoping, extendable and retractable handle assembly (not shown in the figures). In a typical embodiment, a recess is formed in the top of the back portion 12, and a telescoping handle is seated within that recess. The rest of the handle assembly is connected to the telescoping handle and is carried within the back portion 12, typically between its inner face and an inner lining that shields the assembly from view. Additionally, a foot 28 is attached to the bottom of the front or cover portion 14 of the luggage to assist in supporting the piece of luggage 10 in the upright position. A carry handle 29 also attaches to the top of the back portion 12, and other handles and attachment points may be included as necessary or desirable. As shown, the wheel well area may be reinforced by a thickness of a wear-resistant material 31.

The back portion 12 of the piece of luggage 10 may be made of a substantially rigid material or of a more flexible and deformable material, depending on the embodiment. If the back portion 12 is made of a substantially rigid material, that material may be metal, plastic, wood, or composite, depending on the embodiment, the desired aesthetic characteristics, and the size and load that the piece of luggage 10 is to carry. Suitable metals may include steel, aluminum, and titanium. Suitable plastics may include polycarbonate, polypropylene, and acrylonitrile-butadiene-styrene (ABS), as well as any other polymer, plastic, or polymer foam, such as ethylene-vinyl acetate (EVA) foam, that has sufficient strength and durability. For example, 2 mm thick polycarbonate may be used for the back portion 12. Suitable composite materials may include glass fiber and carbon fiber composites. Any outer reinforcements, like the wear-resistant material 31, may be comprised of ABS plastic, polycarbonate, or any other suitably wear-resistant material.

If a more flexible material is desired for the back portion 12, it may be made, for example, of EVA foam or thermoplastic urethane (TPU). If the back portion 12 is made of a more flexible material, it may be reinforced with inner reinforcements, outer reinforcements, or a combination of both.

In pieces of luggage according to embodiments of the present invention, the front or cover portion 14 of the piece of luggage 10 is made of a deformable, resilient material that allows the cover portion 14 to be "crushed" and inverted into the back portion 12 when the piece of luggage 10 is not in use, thereby allowing the piece of luggage 10 to be stored using less space. One example of a suitable deformable material is TPU.

Figure 2:
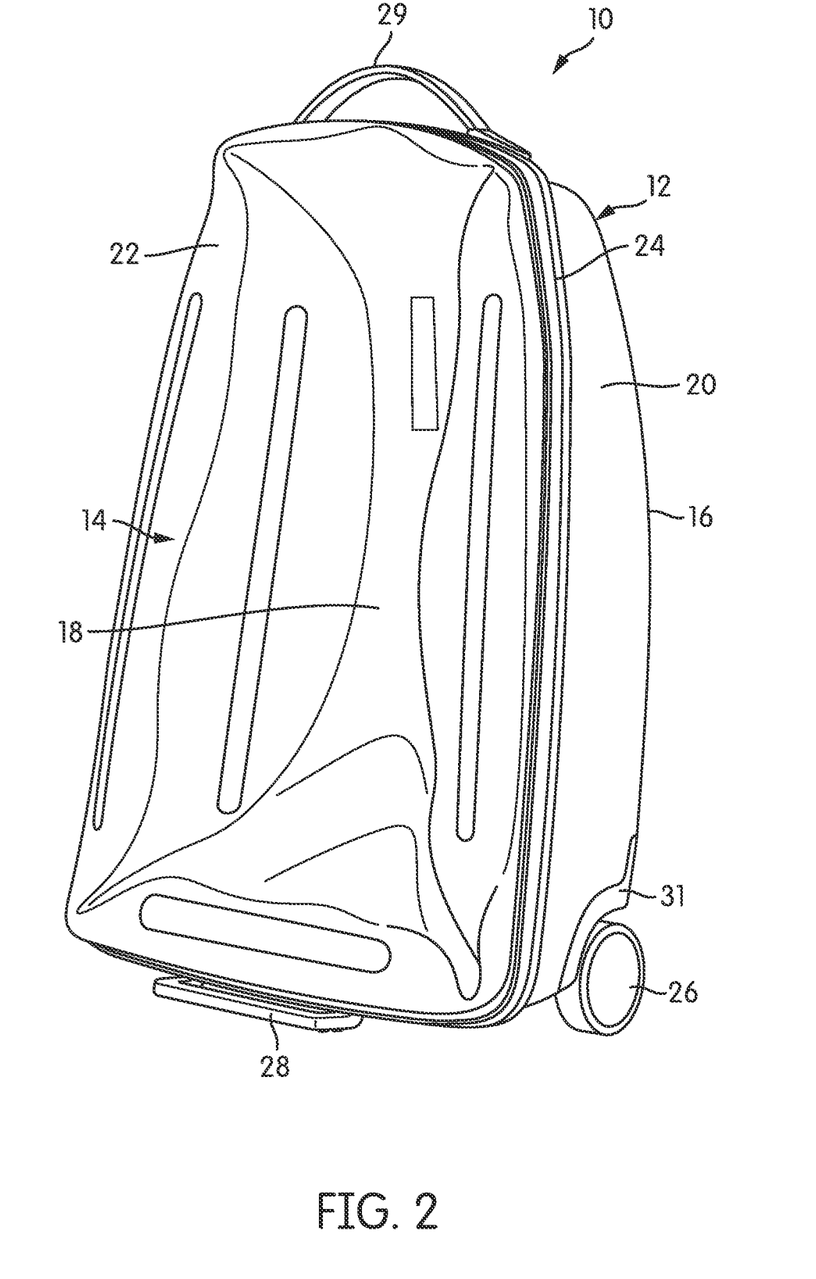
FIG. 2 is a perspective view of the piece of luggage of FIG. 1, shown with the cover in a collapsed configuration, inverted into the luggage.
Figure 3:
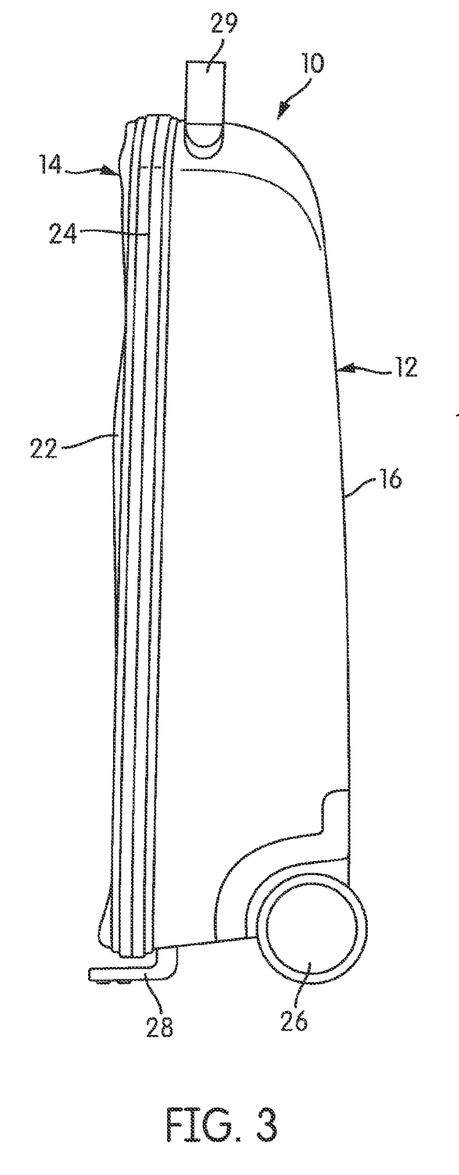
FIGS. 3 and 4 are side elevational views of the piece of luggage in the collapsed and functional configurations, respectively.
Figure 4:
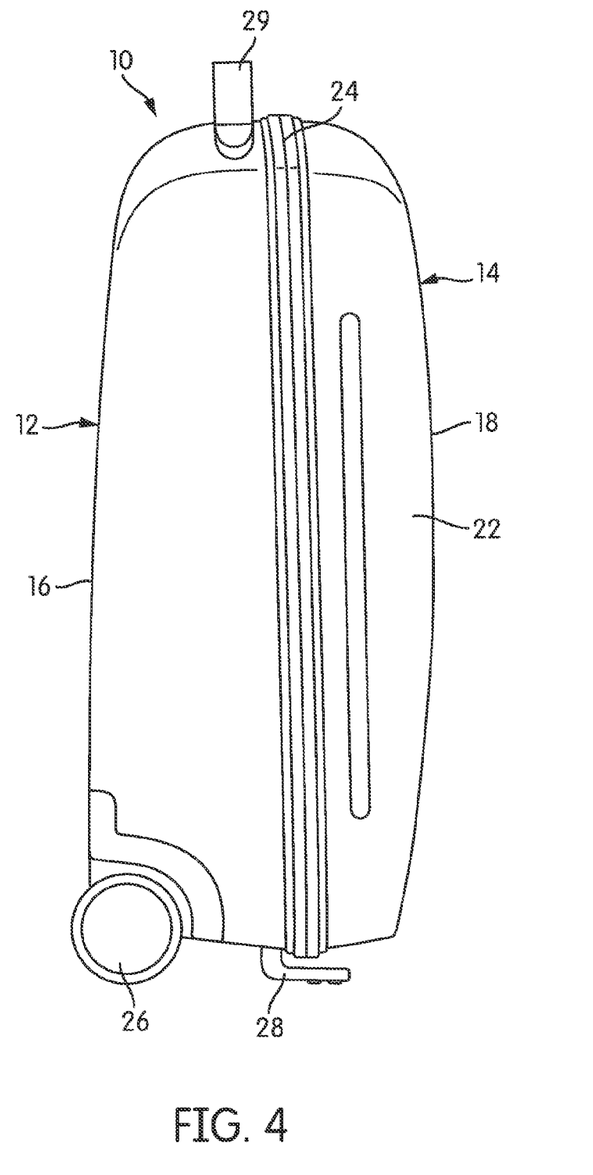

FIG. 2 is a perspective view of the cover portion 14 in the collapsed configuration, and FIGS. 3 and 4 are comparative side elevational views of the piece of luggage in the collapsed and functional configurations, respectively. To put the cover portion 14 into the collapsed configuration, a user simply pushes inward on the cover portion 14, pushing it into the back portion 12 and essentially inverting it and pushing it into the back portion 12. The exact appearance and position of the cover portion 14 in the collapsed or crushed configuration will vary depending on the way in which the force is applied and the nature of the material of which the cover portion 14 is made. As can be seen in FIG. 3, when the cover portion 14 is collapsed, the depth of the piece of luggage 10 is little more than the depth of the back portion 12. In addition, once the cover portion 14 is collapsed, items can be placed in the cavity created by the collapsed cover portion, if desired, allowing a further kind of space savings.

In embodiments of the invention, the cover portion 14 and any other deformable portions are constructed and adapted to be repeatedly collapsed or crushed and repeatedly returned to their original shapes, e.g., with respect to the cover portion 14, to be repeatedly crushed into the configuration shown in FIG. 2 and returned to the configuration of FIG. 1. Thus, they can be moved between the two positions essentially without damage. The phrase "essentially without damage" refers to the fact that the deformable portion can carry essentially the same load and perform the same function after each cycle of crushing/collapsing and restoration of shape. As those of skill in the art will appreciate, every material has a fatigue limit, and the phrase should be construed to encompass normal wear as well as flaws and microstructural damage that do not substantially change the bulk properties or abilities of the material. As will be described below, the process used to form the cover portion 14 and any other deformable portions molds the original, uncrushed shape into those portions in such a way that they are biased to return to that shape when the appropriate forces are supplied.

In some embodiments, the cover portion 14 may be able to perform its functions without reinforcement. However, reinforcing plates or elements may help the cover portion 14 to recover its undeformed shape more quickly in some cases. As one example of how reinforcements may be used, FIG. 5 is a perspective view of the piece of luggage 10 in an open configuration.

Figure 5:
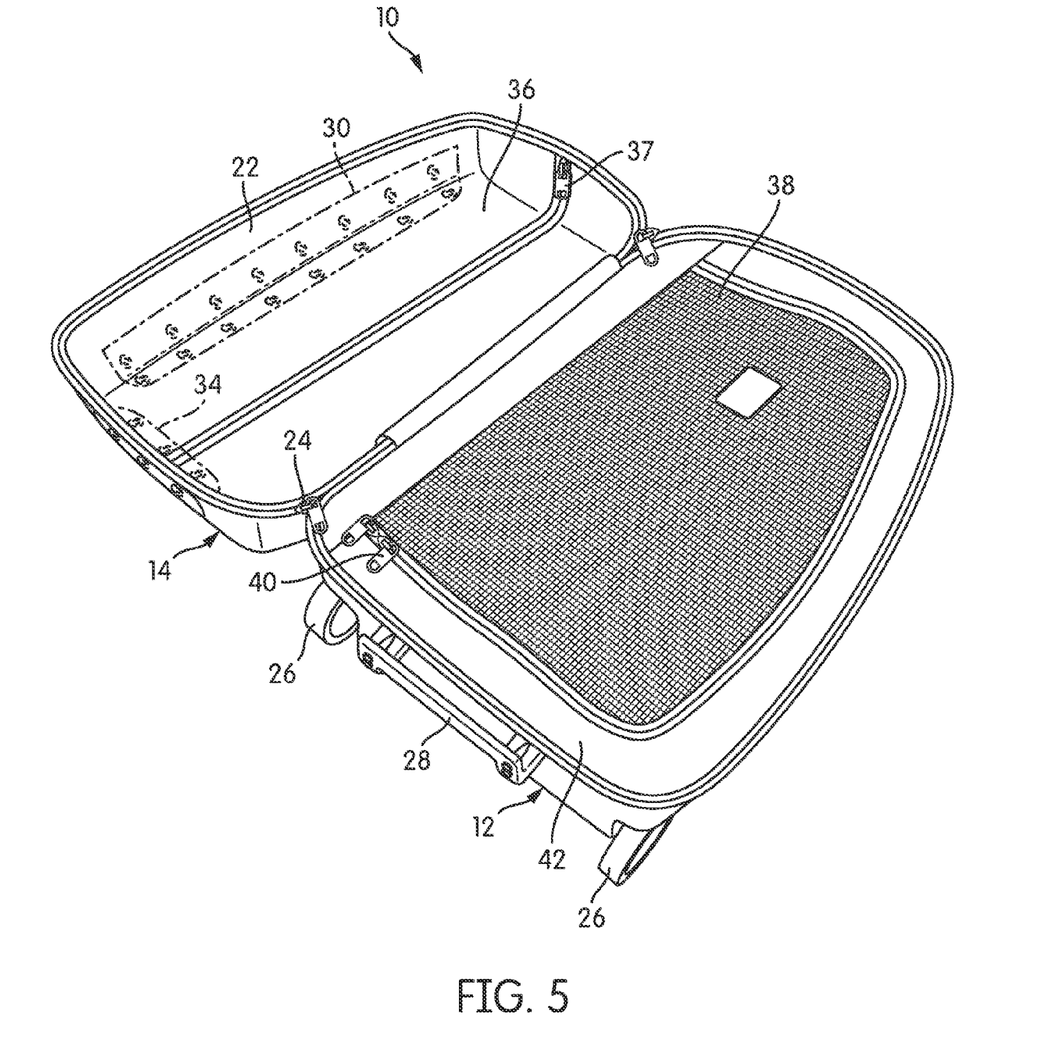
FIG. 5 is a perspective view of the piece of luggage of FIG. 1 in an open configuration.

As shown in FIG. 5, L-shaped reinforcements 30 are installed along the long sides of the cover portion 14, bolted, riveted, or otherwise fastened to the material of the cover portion 14, such that they reinforce the edges where the major area 18 of the cover portion 14 transitions into the depending lip 22. (In the view of FIG. 5, one of the reinforcements 30 is shown in phantom; the reinforcement 30 on the other side is a mirror image of the one shown.) A reinforcement or reinforcements 34 may also be installed along the bottom of the cover portion 14, also at the edge where the major portion 18 transitions into the depending lip 22, to add additional strength and rigidity in areas that may come into repeated contact with the ground. Optionally, a similar reinforcement may be added to the top edge of the cover portion 14. The reinforcements 30, 34 may be, for example, 2 mm polypropylene, or any other substantially stiff or rigid material.

As can be seen in FIG. 5, despite the presence of reinforcements, the majority of the cover portion 14, and in particular, the majority of its major area 18, is unreinforced and free to deform in any way. If more controlled deformations or particular fold lines are necessary for any particular application, either multidimensional reinforcements, like the L-shaped reinforcements 30 or simple reinforcing plates, may be stitched, fastened, adhesively bonded, thermally fused, or otherwise secured to the cover portion 14. This will be described in more detail below.

FIG. 5 also illustrates the interior of the piece of luggage 10 in general. In its interior, the luggage 10 may include any number of interior lining layers. In the illustrated embodiment, a lining material 36 covers the inside of both portions 12, 14. The lining 36 may be soft nylon, microsuede, real or synthetic leather, or another suitable material, and it may be sewn, adhered, thermally fused, or otherwise fastened to the two portions 12, 14. Openings may be provided in the lining material 36 to allow access to the inner faces of the two portions 12, 14 in order to facilitate repairs, if necessary. Those openings may be releasably closed with zippers 37, snaps, hook-and-loop fastener, or other fastening materials.

Additionally, the luggage 10 may include features for securing its contents. Securing features may include netting, straps, pockets, or other compartments. In the illustrated embodiment, the back portion 12 of the luggage 10 includes a mesh netting restraint 38 that attaches to the sides of the back portion 12 via a zippered connection 40 with a piece of gusset material 42, thereby allowing the restraint 38 to be unzipped and moved aside for loading and unloading the luggage.

While the above description focuses on the crushability of the cover portion 14 and a consequent reduction in depth of the piece of luggage 10, if both the back portion 12 and the cover portion 14 of the luggage are made of deformable, resilient materials like TPU, the luggage 10 may be crushable in more than one dimension. A back portion 12 that is made of a deformable, resilient material will typically be at least selectively reinforced, particularly around its wheels 26 and handles.

Materials and Methods of Manufacture

The piece of luggage 10 and other luggage and items according to embodiments of the invention may be made using a number of different materials and a number of different methods. As was noted briefly above, the present inventors have found that thermoplastic urethane (TPU) is one particularly suitable material from which the front or cover portion 14 of the luggage 10 may be made.

In some embodiments, deformable portions, such as the cover portion 14, may be injection molded from TPU. However, in many embodiments, it may be advantageous to form the front or cover portion 14, and other portions of the piece of luggage 10, by vacuum forming. In general, vacuum forming involves heating a sheet of material to a predetermined temperature and/or for a predetermined amount of time and then drawing the heated sheet of material tight against a mold by drawing vacuum against the sheet once it is in contact with the mold. Particular methods for vacuum forming luggage and other items will be described below in more detail. Vacuum forming may be advantageous in part because it requires less initial investment in tooling and molds than comparable injection molding processes.

Figure 6:
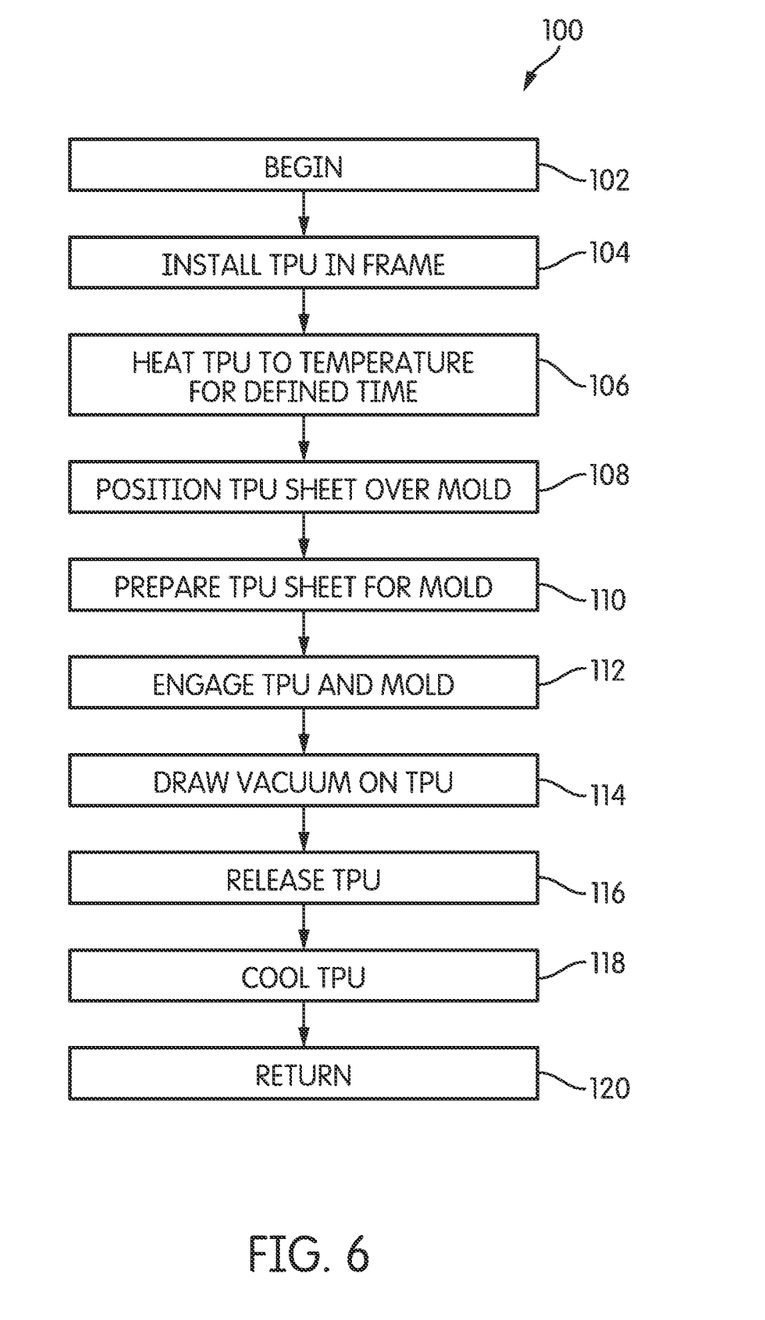
FIG. 6 is a high-level flow diagram of a method for manufacturing a shaped, deformable element, like the piece of luggage of FIG. 1, according to one embodiment of the invention.

FIG. 6 is a high-level flow diagram of a method, generally indicated at 100, for vacuum forming pieces using TPU. Method 100 may be used to form the cover portion 14 of the luggage 10 and any other deformable portions, as well as to form other shapes and parts. Certain tasks of method 100 are illustrated with respect to FIGS. 7-11, which are sectional views of a vacuum forming apparatus, generally indicated at 50, with a mold 52.

Method 100 of FIG. 6 begins at 102 and continues with task 104. At task 104, a sheet of TPU material is installed in a frame 58. Once the TPU sheet is installed in a frame 58, the frame and TPU are exposed to heat at a predefined temperature for a predetermined amount of time, as shown in task 106 of method 100.

Figure 7:
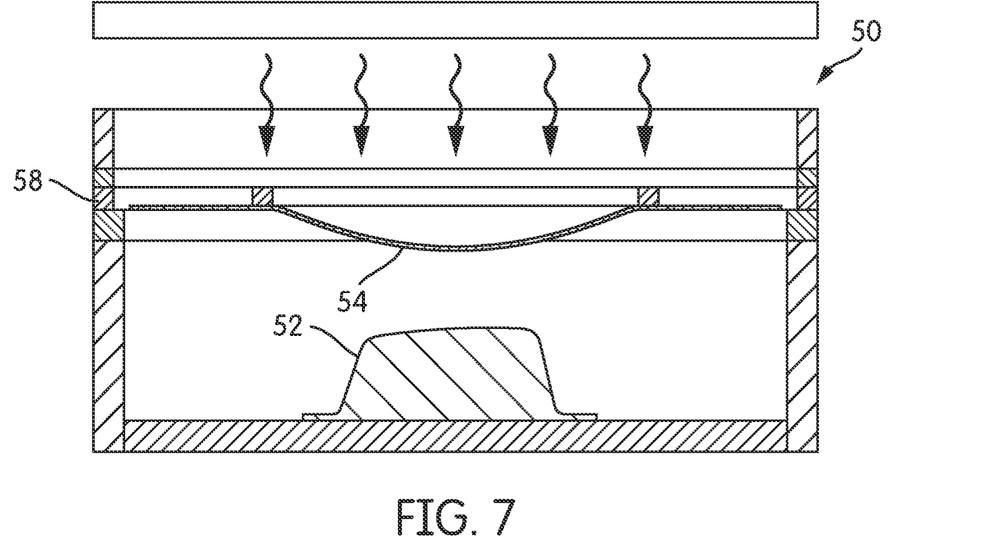
FIGS. 7-11 are side elevational views of a mold and a sheet of material to be formed, illustrating certain tasks of the method of FIG. 6.

The next task of method 100, task 108, is illustrated in FIG. 7. Once the predetermined amount of time has expired, the TPU sheet 54 is moved in its frame 58 out of or away from the heating element or elements and toward the mold 52. In the illustrated embodiment, the TPU sheet 54 is moved directly over the mold.

Figure 8:
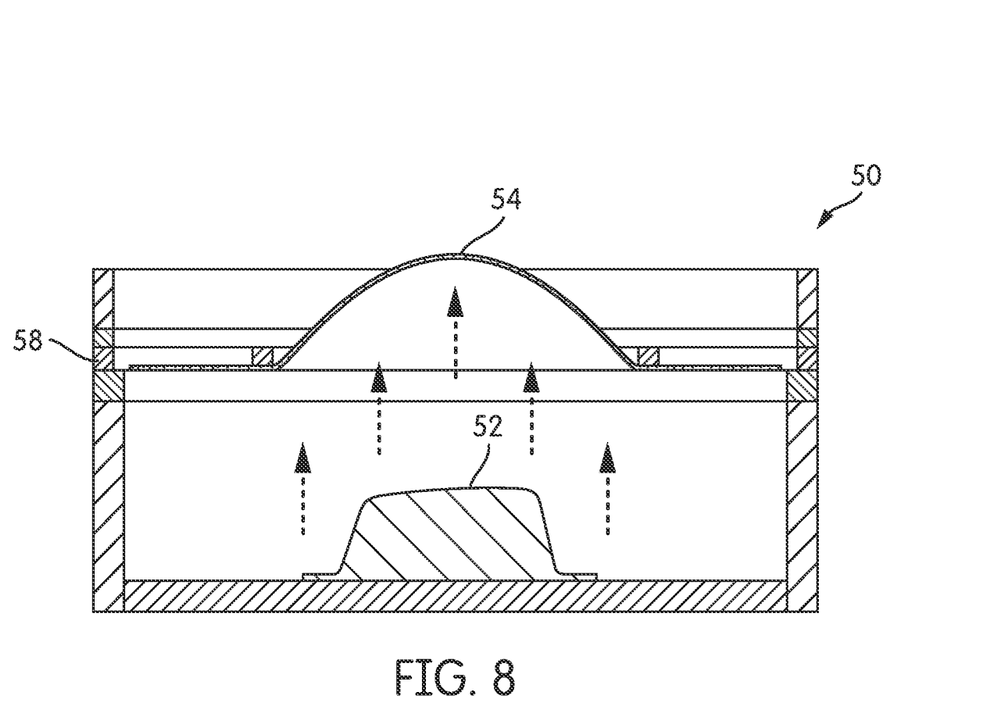
Figure 9:
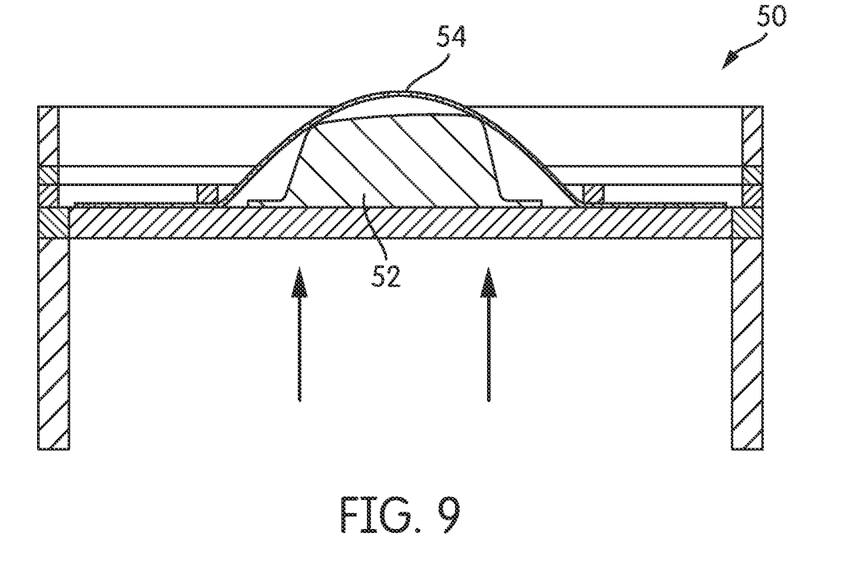

Once the TPU sheet 54 is over the mold 52, method 100 continues with task 110 when the TPU sheet 54 is prepared for engagement with the mold. As shown in FIG. 8, in the illustrated embodiment, preparing the TPU comprises blowing pressurized air at the TPU sheet 54 from the direction of the mold 52, causing the TPU sheet 54 to expand upward.

After the TPU sheet 54 is prepared, either the mold 52 is moved into engagement with the TPU sheet 54 or the TPU sheet 54 is moved into engagement with the mold 52, as shown in task 112 of FIG. 6. The sense of the motion (i.e., which part or parts 52, 54 move and in which direction) and the orientation of the parts 52, 54 may vary, depending on the nature of the apparatus used and other factors. The mold 52 and TPU 54 are shown in initial engagement or contact in the view of FIG. 9.

Figure 10:
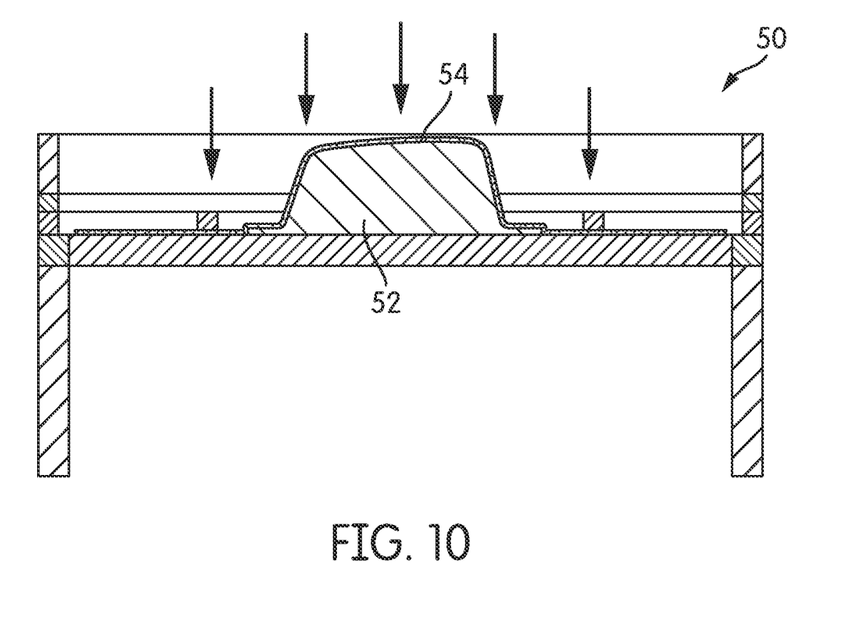
Figure 11:
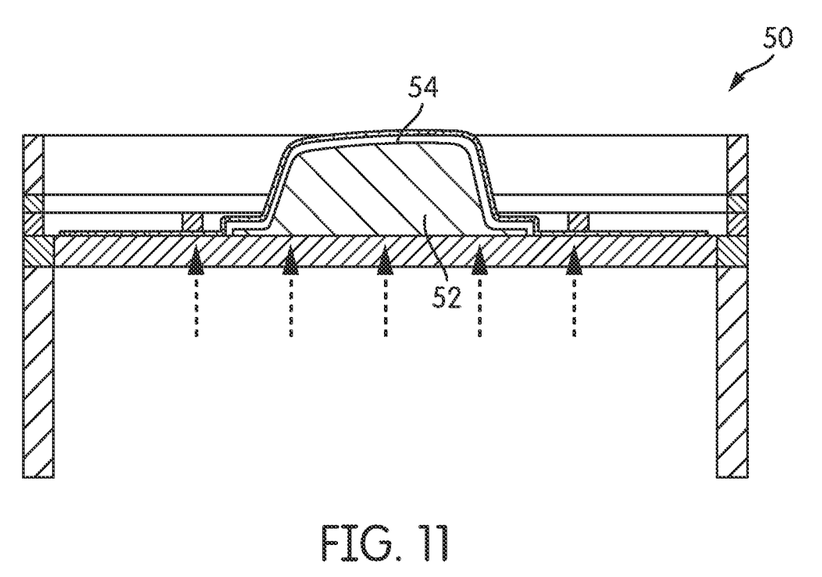

As shown in FIG. 10 and in task 114 of FIG. 6, once the TPU sheet 54 and the mold 52 are brought into contact, vacuum is drawn against the TPU sheet to force the TPU sheet 54 to conform to the shape of the mold 52. This may be done by drawing vacuum through holes or channels provided in the mold 52 or in the surrounding assembly. Shortly thereafter, the TPU sheet 54 is separated from the mold 52, as shown in FIG. 11 and in task 116 of FIG. 6. This may be done by mechanically drawing the two parts 52, 54 apart. However, in the illustrated embodiment, compressed air is channeled through the mold 52 to push the TPU sheet 54 off of the mold 52. Doing so helps to prevent physical deformation of the TPU sheet 54 as it is released from the mold.

During method 100, the mold 52 is preferably not heated and remains cool. Although the mold 52 need not be actively cooled in most embodiments, it may be helpful to place and orient the mold 52 as far from heating elements and heat sources as possible.

The entire process illustrated in FIGS. 7-11 may require less than 30 seconds per piece once the TPU sheet 54 has been heated for the requisite amount of time at the requisite temperature. For example, the TPU sheet 54 may require 3 seconds on the mold 52 to form and 17 seconds on the mold 52 cooling before the mold 52 and the TPU sheet 54 are disengaged, depending on the thickness of the TPU sheet 54 and other factors. After the TPU sheet 54 is released from the mold, as shown in method 100, additional tasks may be performed to turn the formed TPU sheet 54 into a finished part.

As shown in task 118, the present inventors have found that it may be helpful to cool the TPU sheet 54 on a mold form identical to the one on which it was made for some period of time. For example, a formed TPU sheet 54 may be cooled on a wooden form that has the same shape as the original mold for a period of about one hour in some embodiments. Excess material may also be cut away from the formed TPU sheet 54 and any other necessary tasks performed to finish the TPU in the desired shape. In other embodiments, the material may be annealed or otherwise heat treated at elevated temperatures to reduce or re-orient internal stresses. It should be understood, however, that task 118 may be optional in some embodiments; that is, it may not be necessary to cool or further treat the formed TPU at all. Method 100 returns in task 120.

The particular temperature and time conditions that are used in method 100 and in vacuum forming methods according to other embodiments of the invention will vary with, for example, the thickness of the material, the hardness of the material, the nature and amount of any colorants or additives that may be present in the material, and the nature of the apparatus using which the forming tasks are performed.

It should be understood that while the above description focuses on the vacuum forming of TPU sheets, in some embodiments, the back portion 12 of the luggage may also be vacuum formed, for example, from polycarbonate material, using a similar process.

Examples

In the following examples, unless otherwise noted, the TPU materials were obtained from Bayer MaterialScience (Dormagen, Germany), and were molded into the general shape of a luggage cover. The time and temperature conditions listed below in Table 1 were sufficient to cause the TPU to assume the shape of the mold and to retain and return to that shape after being rolled, folded, or crushed. The times and temperatures specified refer to the amount of time that a sheet of TPU was heated at that temperature.

In each of Examples 1-6, the TPU sheet was formed in the shape of a luggage cover similar to the cover portion 14 of the luggage 10 described above. In each case, the depth of the luggage cover was 3 inches. The height of the cover was approximately 21.5 inches and the width was about 14.5. Allowing for excess, the size of the TPU sheet at the beginning of the process may be on the order of about 36 inches by 36 inches (e.g., 1 square yard or 1 square meter).

TABLE 1

Examples

| No. | Material | Hardness (Shore A) | Thickness | Time | Temperature |
|---|---|---|---|---|---|
| 1 | DESMOPAN ® 5377A (Clear) | 77A | 2 mm | 1 min. | 212° F. |
| 2 | UT7-85A (Gray) | 86A | 2 mm | 22 sec. | 273° F. |
| 3 | UT7-77A (Gray) | 77A | 2 mm | 22 sec. | 273° F. |
| 4 | UT7-85A (Clear) | 86A | 2 mm | 22 sec. | 266-284° F. |
| 5 | UT7-90A (Gray) | 90A | 2 mm | 22 sec. | 273° F. |
| 6 | UT7-95A (Gray) | 95A | 2 mm | 22 sec. | 273° F. |

As those of skill in the art will understand, Table 1 above shows the time and temperature conditions that caused the TPU to assume the mold shape. The molded TPU in the above examples was not annealed at elevated temperature or further treated, although TPU may be annealed at elevated temperature or further treated in some embodiments of the invention. In general, the sheets of TPU all assumed the shape of the mold satisfactorily, although it was found that the harder TPU sheets, and particularly the TPU of Example 6, with a hardness of 95 Shore A, assumed the desired shape with less bubbles, ripples, and flaws than did the other sheets. Additionally, the conditions of Example 6 were replicated with clear (transparent), gray, and black TPU of 95 Shore A hardness, and the results were found to be substantially similar.

As was described above, in many embodiments of the invention, the TPU may be the sole layer of a luggage cover or another piece. In other embodiments, TPU may be the outermost layer. In yet other embodiments, other materials, such as fabric and rubber sheets, may be bonded, stitched, fused, or otherwise adhered to the outer or inner faces of the TPU for aesthetic or other reasons. The lining material 36 shown in FIG. 5 is one example.

In addition to the types of reinforcements described above, which are primarily used to ensure that the piece of luggage 10 can withstand the forces, loads, and wear to which it will be exposed, the TPU may be selectively reinforced to fold along particular fold lines. While the description above focuses on the addition of reinforcements after the vacuum forming process is complete, reinforcements may also be added before the vacuum forming process is complete, provided that the reinforcements are made of a material that will not be substantially affected by the elevated temperature and other conditions of the vacuum forming process.

For example, U.S. Pat. No. 7,500,547, the contents of which are incorporated by reference herein in their entirety, discloses generally hard-sided luggage that folds into a storage configuration. The cover of that luggage defines a number of geometric segments and a number of fold lines in predefined locations that allow the cover to fold into a predefined configuration.

As a further example, the cover of the luggage from U.S. Pat. No. 7,500,547 was vacuum-formed from TPU with appropriate reinforcements. As a first step, polycarbonate reinforcing plates 2 mm thick were prepared by cutting from a larger section of polycarbonate. (Reinforcing plates may be made of any appropriate material, and may be machined (e.g., CNC machined), laser-cut, hand cut, or prepared by some other process.)

The reinforcing plates were then bonded to a 2 mm sheet of 85 Shore A hardness TPU using adhesive intended to bond TPU to polycarbonate. When bonded, the reinforcing plates had the general shapes illustrated in FIGS. 5-7 of U.S. Pat. No. 7,500,547, and they were adhered in approximately the locations described in that patent.

The glue was allowed to cure for 10 minutes (or, alternatively, 5 minutes in a drying oven) and the bonded assembly was vacuum formed under the temperature and time conditions described above with respect to Example No. 1. When in use, the TPU material acts as gusset material and defines fold lines between adjacent reinforcing plates, which, in this case, are polycarbonate plates bonded to the TPU. In other embodiments, the reinforcements could be bonded to a sheet of TPU that has already been vacuum formed, for example, either before it is completely cooled or after.

Although the above description focuses on methods and techniques for vacuum forming TPU sheets into luggage covers and parts, as those of skill in the art will recognize, the same methods and techniques may be used to form other types of parts, and particularly other types of parts with similar dimensional ratios and depths.

While the invention has been described with respect to certain embodiments, the description is intended to be exemplary, rather than limiting. Modifications and changes may be made within the scope of the invention, which is defined by the appended claims.

What is claimed is:

1. A piece of luggage, comprising:
   a substantially rigid back portion including a first major area and a contiguous first generally perpendicular depending lip, the first depending lip giving the back portion a substantial back depth;
   a cover portion made of a single, continuous, resilient sheet of thermoplastic urethane (TPU) that defines both a second major area and a contiguous second generally perpendicular depending lip, the second depending lip giving the cover portion a substantial cover depth, the second generally perpendicular lip of the cover portion being hingedly connected to the first generally perpendicular lip of the back portion along one side or edge thereof, thereby connecting the cover portion and the back portion for hinged movement relative to one another, the cover portion having reinforcements more rigid than the sheet of TPU selectively attached at transitions between the second major area and the second depending lip, such that the sheet of TPU acts as a sole structural layer in unreinforced areas of the cover portion, the cover portion having sufficient resilience and deformability to be inverted into a cavity defined by the back portion and then resiliently returned, essentially without damage, to an original shape; and a fastener or set of fasteners provided around edges of the first and second depending lips, the fastening system being configured and arranged to releasably join the back portion and the cover portion to define an interior storage space of the piece of luggage.

2. The piece of luggage of claim 1, wherein the layer of TPU is an outermost layer of the cover portion.

3. The piece of luggage of claim 1, wherein a majority of the second major area is unreinforced.

4. The piece of luggage of claim 1, wherein the second major area is generally rectangular.

5. The piece of luggage of claim 4, further comprising L-shaped reinforcements secured between the second major area and the second depending lip along long sides of the second major area.

6. The piece of luggage of claim 1, wherein the back portion comprises polycarbonate.

7. The piece of luggage of claim 1, wherein the TPU has a hardness in the range of about 77-95 Shore A.

8. The piece of luggage of claim 7, wherein the TPU has a hardness in the range of about 90-95 Shore A.

9. The piece of luggage of claim 1, further comprising wheels and a telescoping handle assembly connected to or carried by the back portion.

10. The piece of luggage of claim 1, wherein the cover depth is about 70% of the back depth.

11. A method of making a piece of luggage, comprising:
heating a sheet of thermoplastic urethane (TPU) at a predefined temperature for a predefined period of time;
engaging the heated sheet of TPU with a mold defining a relatively flat central portion and a deep depending lip;
drawing vacuum against the sheet of TPU to conform it to the contours of the mold;
releasing the molded sheet of TPU from the mold;
cutting and finishing the molded sheet of TPU to form a luggage cover or back portion; and
joining the luggage cover or back portion hingedly with a complementary portion to create the piece of luggage, such that the molded sheet of TPU serves as an outer layer and a sole structural layer over at least a portion of the luggage cover or back portion;
wherein the luggage cover or back portion has sufficient deformability that it may be inverted into the piece of luggage and then returned, essentially without damage, to an original shape.

12. The method of claim 11, further comprising, prior to said cutting, cooling the molded sheet of TPU on a form having a shape substantially the same as a shape of the mold.

13. The method of claim 12, wherein the form is comprised of wood.

14. The method of claim 11, wherein the TPU sheet has a thickness of about 2 mm.

15. The method of claim 11, wherein the TPU sheet has a hardness in the range of about 77-95 Shore A.

16. The method of claim 11, wherein the luggage cover or back portion has a depth in the range of about 3-8 inches.

17. The method of claim 11, wherein the predefined temperature is in the range of about 266° F.-284° F.

18. The method of claim 17, wherein the predefined time is about 22 seconds.

19. The method of claim 11, wherein the TPU sheet has a thickness of about 2 mm.

20. A piece of luggage comprising:
a back portion including a first major area and a contiguous first generally perpendicular depending lip, the first depending lip giving the back portion a substantial back depth;
a cover portion including a second major area and a contiguous second generally perpendicular depending lip, the second depending lip giving the cover portion a substantial cover depth, the second generally perpendicular lip of the cover portion being hingedly connected to the first generally perpendicular lip of the back portion along one side or edge thereof, thereby connecting the cover portion and the back portion for hinged movement relative to one another, the cover portion being constructed of a single sheet of thermoplastic urethane (TPU) of sufficient deformability that it may be inverted into a cavity defined by the back portion and then returned, essentially without damage, to an original shape; and
a fastener or set of fasteners provided around edges of the first and second depending lips, the fastening system being configured and arranged to releasably join the back portion and the cover portion to define an interior storage space of the piece of luggage;
the piece of luggage being produced by a process comprising:
heating a sheet of thermoplastic urethane (TPU) at a predefined temperature for a predefined period of time;
engaging the heated sheet of TPU with a mold;
drawing vacuum against the sheet of TPU to conform it to the contours of the mold;
releasing the molded sheet of TPU from the mold;
cutting and finishing the molded sheet of TPU to form the cover portion; and
joining the cover portion hingedly with the back portion to create the piece of luggage.

21. The piece of luggage of claim 1, wherein the cover depth and the back depth are essentially equal.

* * * * *